UNITED STATES PATENT OFFICE.

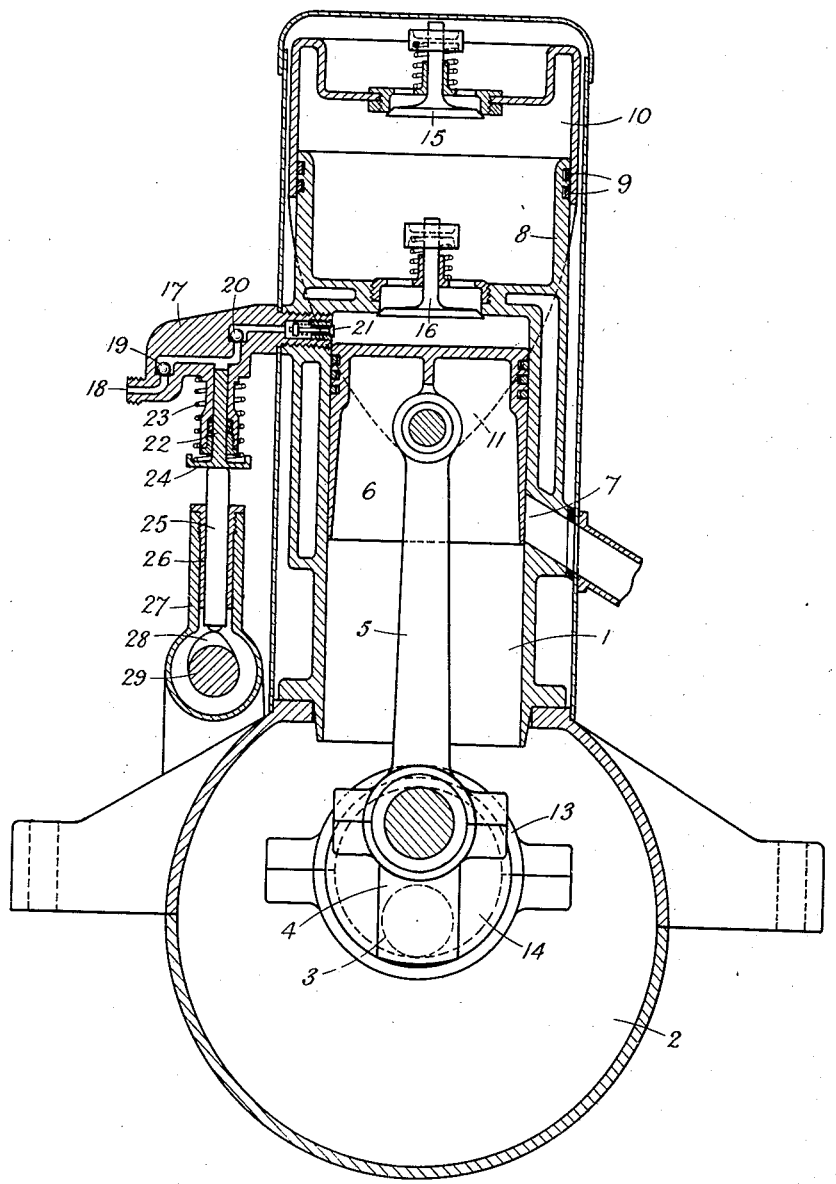

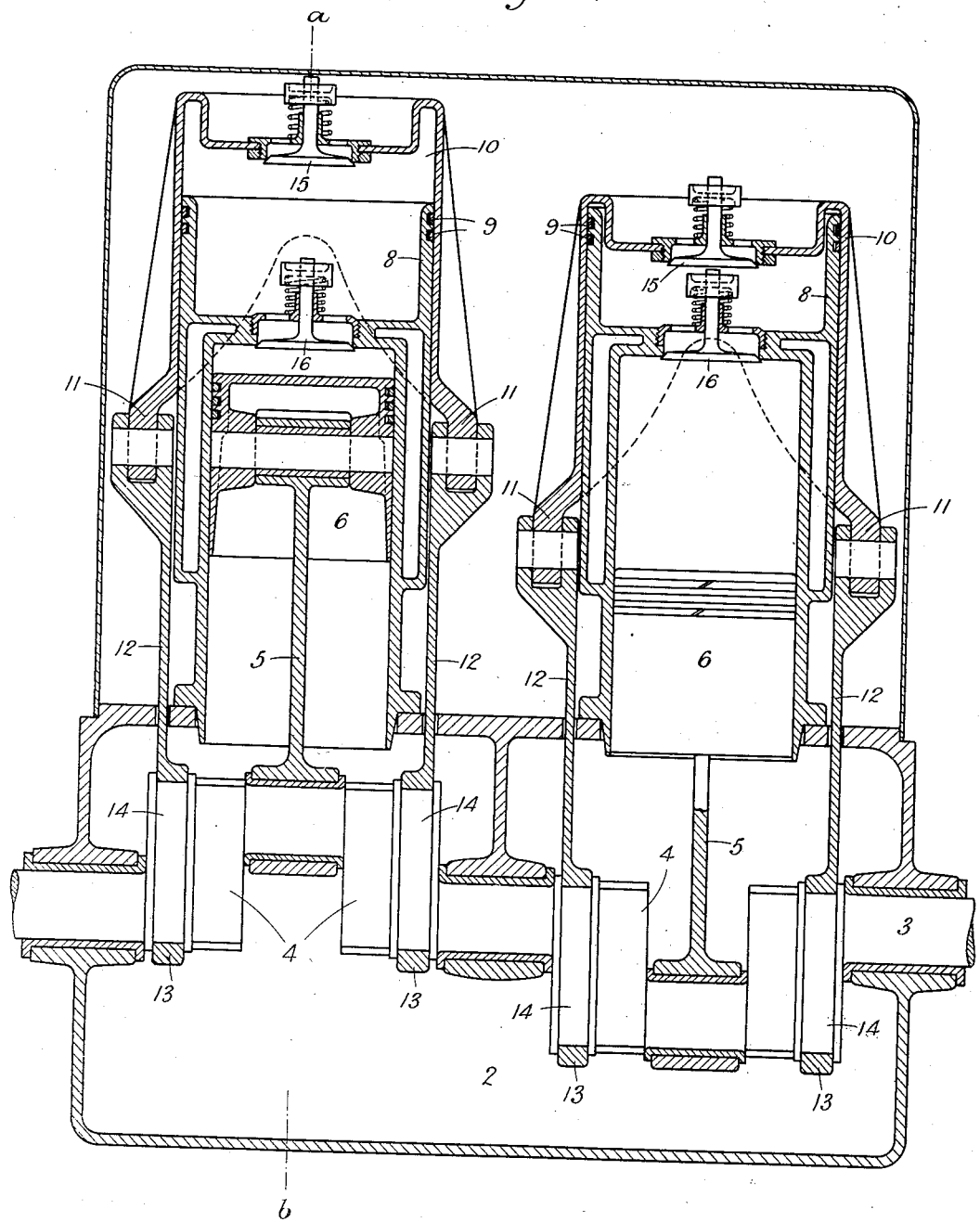

JOHN MORECRAFT WELLINGTON AND DUNCAN GORDON MACKENZIE, OF ILFORD, ENGLAND.

INTERNAL-COMBUSTION ENGINE OF THE TWO-STROKE TYPE.

1,364,664. Specification of Letters Patent. Patented Jan. 4, 1921.

Application filed June 22, 1920. Serial No. 390,974.

*To all whom it may concern:*

Be it known that we, JOHN MORECRAFT WELLINGTON and DUNCAN GORDON MACKENZIE, subjects of the King of Great Britain and Ireland, residing at 24 Empress avenue, Ilford, in the county of Essex, England, have invented new and useful Improvements in Internal-Combustion Engines of the Two-Stroke Type, of which the following is a specification.

The invention relates to an improved internal combustion engine of the two-stroke type.

The improved engine comprises combustion or working cylinders and air-compressing cylinders which are arranged in line with and are made of greater diameter than the working cylinders. The pistons of the combustion cylinders reciprocate in the latter, but the air-compressing pistons are fixed. The air-compressing cylinders moving on the fixed air-compressing pistons, travel in the same directions as the working pistons and are operated by means of eccentrics or the like on the crank shaft of the engine, which are such that they move the air-compressing cylinders through about one-half the distance traveled by the working pistons. The different sets of cylinders are provided with valves for admitting air to the air-compressing cylinders and with valves for controlling the passage to the combustion cylinders of the air compressed in the air-compressing cylinders.

The accompanying drawings illustrate an engine constructed in accordance with the invention.

Figure 1 is a transverse section of the engine, taken on the line *a—b* of Fig. 2, and Fig. 2 is a longitudinal section of the engine.

1 are combustion or working cylinders, hereinafter referred to as combustion cylinders, which are secured to a chamber 2 containing a crank shaft 3, the cranks 4 of which are connected by means of rods 5 to trunk pistons 6 working in the cylinders 1. These combustion cylinders 1 are formed with suitably disposed exhaust ports 7 adapted to be opened and closed by the pistons 6, and are provided at their upper ends with extensions, in the form of hollow or trunk pistons 8, which are fitted with rings 9. Air-compressing cylinders 10 work over the pistons 8 provided at the upper ends of the combustion cylinders 1, and are formed on their inner ends with lugs or extensions 11. These lugs or extensions 11 are connected by rods 12 and straps 13 to eccentrics 14 formed on the outer sides of the webs of the crank shaft 3 and having a throw of about half that of said shaft. The upper closed ends of the air-compressing cylinders 10 are fitted with inlet valves 15, and the upper closed ends of the combustion cylinders 1 with transfer valves 16, both of which sets of valves are automatic in action. The engine is provided with any suitable arrangement of parts for the supply of fuel, such, for instance, as petrol under pressure, and with the necessary sparking plugs. When the fuel supplied to the engine consists of petrol under pressure the arrangement of parts shown in Fig. 1 may be adopted, that is to say a casting 17 of the shape shown, connected at 18 to a source of petrol under pressure, may be fitted to each cylinder of the engine. This casting 17 is provided with non-return valves 19 and 20, with a spring-controlled valve 21, and with a plunger 22 controlled by a spring 23. The lower end of the plunger 22 is formed with a head 24, which is pressed by the spring 23 against the upper end of a rod 25. The rod 25 is guided in a sleeve 26 secured in a casting 27, and bears at its lower end against a cam 28 rotating in the lower part of the casting 27. The cam 28 is formed in one with a shaft 29 which is rotated from the crank shaft by means of chain gearing.

The improved engine works in the following manner:—

Assuming that the piston in one of the combustion cylinders of the engine has reached its outermost position, then as said piston commences to move inward air will be drawn into the air-compressing cylinder in front of it and the air present in said combustion cylinder will be compressed. Fuel is injected toward the end of the inward stroke of the working piston into the compression space of the combustion cylinder. The explosive mixture is ignited at or about the commencement of the return stroke of the working piston, and as the working piston travels outward the air previously drawn into the air-compressing cylinder will be compressed. As soon as the exhaust port of the combustion cylinder is uncovered by the working piston the valve in the head of said cylinder will open and a scavenging charge of compressed air will pass into the combustion cylinder which will drive out the products of combustion and cool the combustion cylinder, while a charge of air sufficient for combustion will be left in the combustion cylinder and will be compressed on the next instroke. The same actions take place in the other set of cylinders.

Any desired number of sets of cylinders may be used, and these sets be arranged side by side or be radially disposed around a common crank shaft. When the sets of cylinders are placed side by side or not more than four sets of radially disposed cylinders are used an ordinary multi-throw crank is employed.

Having now described our invention what we have invented and desire to secure by Letters Patent of the United States is as follows:—

1. An internal combustion engine of the two-stroke type comprising fixed combustion cylinders, pistons reciprocating in said combustion cylinders, fixed air-compressing pistons of greater diameter than said working pistons, located at the upper ends of said combustion cylinders, air-compressing cylinders reciprocating on said air-compressing pistons, traveling with and in the same directions as said working pistons and operated from the crank shaft of the engine, air-admission valves fitted to said air-compressing cylinders, and valves for controlling the passage to said combustion cylinders of the air compressed in said air-compressing cylinders, substantially as described.

2. An internal combustion engine of the two-stroke type consisting of fixed combustion cylinders, exhaust ports in said combustion cylinders, pistons reciprocating in said combustion cylinders and coöperating with said exhaust ports, fixed air-compressing pistons integral with and arranged in line with said combustion cylinders, air-compressing cylinders reciprocating on said air-compressing pistons and operated by rods and straps mounted on eccentrics on the crank shaft of the engine, automatic air-admission valves fitted to the upper ends of said air-compressing cylinders, automatic valves for controlling the passage to said combustion cylinders of the air compressed in said air-compressing cylinders, and means for supplying fuel under pressure to said combustion cylinders, substantially as described.

In testimony whereof we have signed our names to this specification.

JOHN MORECRAFT WELLINGTON.
DUNCAN GORDON MACKENZIE.